United States Patent [19]

Steele et al.

[11] Patent Number: 5,534,848
[45] Date of Patent: Jul. 9, 1996

[54] AUTOMOTIVE FAULT TOLERANT SERIAL COMMUNICATION

[75] Inventors: Robert E. Steele, Cortland; Mark E. Burns, Burton; David M. Felden, Boardman, all of Ohio

[73] Assignee: General Motors Corporation, Detroit, Mich.

[21] Appl. No.: 246,036

[22] Filed: May 19, 1994

[51] Int. Cl.[6] .................................................. G08B 23/00
[52] U.S. Cl. ...................... 340/517; 340/428; 280/707; 280/735; 364/424.03
[58] Field of Search ..................... 340/825.06, 825.16, 340/825.18, 825.5, 517, 518, 428, 436, 931, 458, 642, 507; 371/5.5, 8.2, 14; 364/424.03, 424.04; 280/735, 707

[56] References Cited

U.S. PATENT DOCUMENTS 4,949,078  8/1990  Ito et al. ................................. 340/438
5,085,464  2/1992  Behr et al. ............................. 280/735
5,388,045  2/1995  Kamiya et al. ........................ 340/438

*Primary Examiner*—John K. Peng
*Assistant Examiner*—Daniel J. Wu
*Attorney, Agent, or Firm*—Michael J. Bridges

[57] ABSTRACT

A fault tolerant automotive serial communication network includes a central communication node directly connected to a plurality of automotive electronic devices through corresponding interface circuitry including fault tolerant circuitry for detecting a serial communication fault in the corresponding device and for rapidly and substantially unintrusively removing the device from the network for the duration of the detected fault to minimize the impact of the fault on network operation.

10 Claims, 2 Drawing Sheets

AUTOMOTIVE FAULT TOLERANT SERIAL COMMUNICATION

FIELD OF THE INVENTION

This invention relates to serial communications between electronic devices and, more specifically, to fault tolerant serial communications in a serial communication network including a plurality of automotive electronic devices.

BACKGROUND OF THE INVENTION

It is known to strategically locate electronic devices throughout an automotive vehicle. Each device is dedicated to at least one operation, such as a control or diagnostic operation. It may be necessary in the carrying out of the various operations for the devices to share data, such as data indicating vehicle parameter values, which must be frequently exchanged between various devices while the vehicle is operating. A single, global, bi-directional serial communication link has been used for data exchange between various electronic devices on-board a vehicle. Each of the devices has read and write access to the link.

The integrity of the link may thus depend on the integrity of any of the devices that access the link. For example, certain short-circuit fault conditions in any device accessing the link have potential to pollute the link and thus affect the performance of the other devices accessing the link, such as by interfering with the sharing of important vehicle parameter data between the devices. Indeed, the performance and reliability of a fault-free communication link and a number of fault-free devices using the link could be reduced through a fault condition in just one device on the link.

Sophisticated communications control and diagnostics for a number of devices sharing a communication link is known. Local Area Networks LANs are well-known in the communication art and typically include fault protections that attempt to isolate device faults so as to minimize the impact of such faults on the operation of the link or of other devices relying thereon. The fault protections provided by LANS are not appropriate for automotive on-board communications for several reasons. The sophisticated protections of LANs consume a prohibitive amount of power and physical space for application on-board conventional vehicles in which power and space are limited. The cost of such sophisticated protections are likewise prohibitive. For example, complex electronics or even dedicated controllers may, at significant expense, be used in conventional LAN technology to provide fault protection. To make these electronics compatible with the relatively harsh operating environment on-board an automotive vehicle would likely add further expense. Finally, the intrusiveness of the typical LAN fault protection circuitry in the communication it is designed to protect make it undesirable for application on-board a vehicle. For example, a substantial amount of information in the form of serial data on the communication link may be lost while the LAN fault protection circuitry is providing a remedy for a detected fault. While this loss of information may be tolerable in other applications, it is not tolerable in a moving automotive vehicle.

It would therefore be desirable to provide for detection and isolation of faults in a communication network on-board an automotive vehicle without adding significant expense, package size, or power consumption, and without interfering significantly with communications on the network.

SUMMARY OF THE INVENTION

The present invention addresses the described need through an automotive serial communication network configuration including simple, inexpensive, and low-power interface circuitry between automotive electronic devices and a global bi-directional serial communication link to provide substantially non-intrusive identification and isolation of certain serial communication faults in any of the devices.

More specifically, a central connection point is provided in the communication network. All devices communicating in the network may then have an independent connection point to the central connection point, defining plurality of nodes connected together through the central connection point. A simple interface circuit comprised of inexpensive, low-power circuit elements is provided for each device participating in the network. The device is attached to the network through its interface circuit. The interface circuit quickly and substantially non-intrusively determines a presence of a short to a supply voltage or to ground, and then quickly and substantially un-intrusively removes the corresponding device from the network, allowing the remaining portion of the network to continue on intact.

In a further aspect of this invention, power requirements of the network are further reduced through low-cost, low-power wake-up circuitry, which disables certain active circuit elements with significant stand-by power requirements when such elements are not in use. The cost, packaging and power requirements may be even further reduced by grouping multiple electronic devices into a single node of the network, so they may share a single interface circuit.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
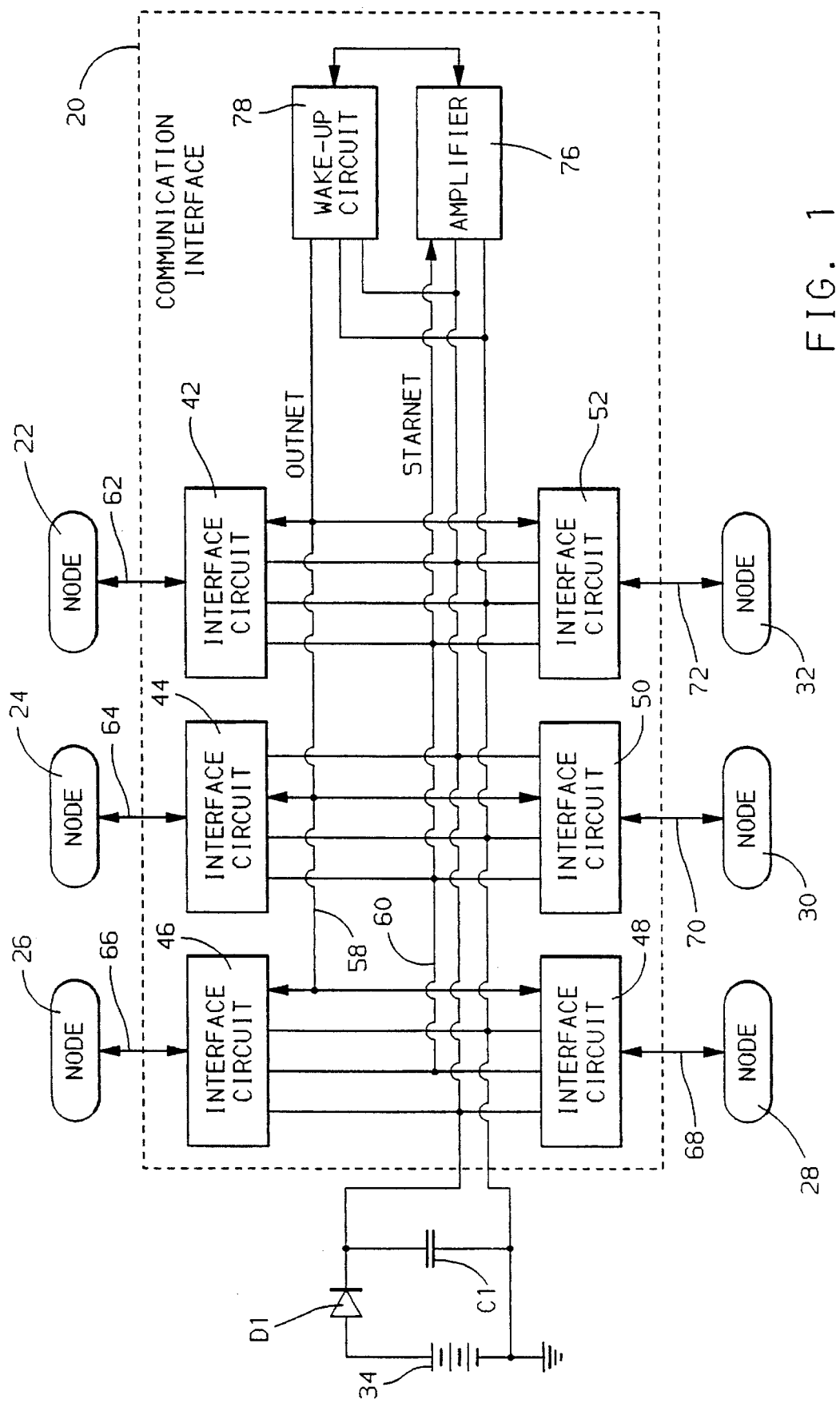
FIG. 1 is general diagram of the communication network of the present invention.

Referring to FIG. 1, a communication network is shown in which a plurality of nodes 22–32 pass information in the form of digital serial bi-directional streams of data through a communication interface 20. Each of the nodes may terminate in an electronic device, such as an electronic controller responsible for certain vehicle operations, such as control or diagnostic operations. For example, a node may terminate in a conventional digital controller, such as an engine or transmission controller, an antilock brake controller, a suspension controller, a traction controller, a controller for vehicle interior comfort features or for radio controls, vehicle diagnostic or maintenance systems, etc. This invention is intended to extend to any electronic device, system, or controller on-board an automotive vehicle or off-board an automotive vehicle that reads information from or writes information to a shared vehicle serial communication bus. While the standard Society of Automotive Engineers J1850 protocol is a preferred serial communication protocol for the present embodiment, the present invention is intended to apply to other conventional serial communication protocols.

Through simple modification to the hardware of the present embodiment, one possessing ordinary skill in the digital serial communication art may adapt such hardware to operate with a wide variety of alternative communication protocols.

The present invention may be readily applied to a communication network having virtually any number of nodes, the present embodiment is shown with just six nodes 22–32. The network may include additional nodes as additional electronic devices are added to the network. Each of the nodes 22–32 is provided a corresponding dedicated interface circuit from the respective group of interface circuits 42–52. One or more nodes may additionally be combined and interfaced to the network via a single interface circuit for cost and power consumption reduction. Each node in the network communicates with other nodes in the network through its interface circuit. A corresponding bi-directional serial communication link from the group of links 62–72 is provided between each node and the corresponding interface circuit to pass information between the node and the interface circuit. The communication links 62–72, correspond to the respective nodes 22–32 and to the respective interface circuits 42–52.

Figures 2, 3:
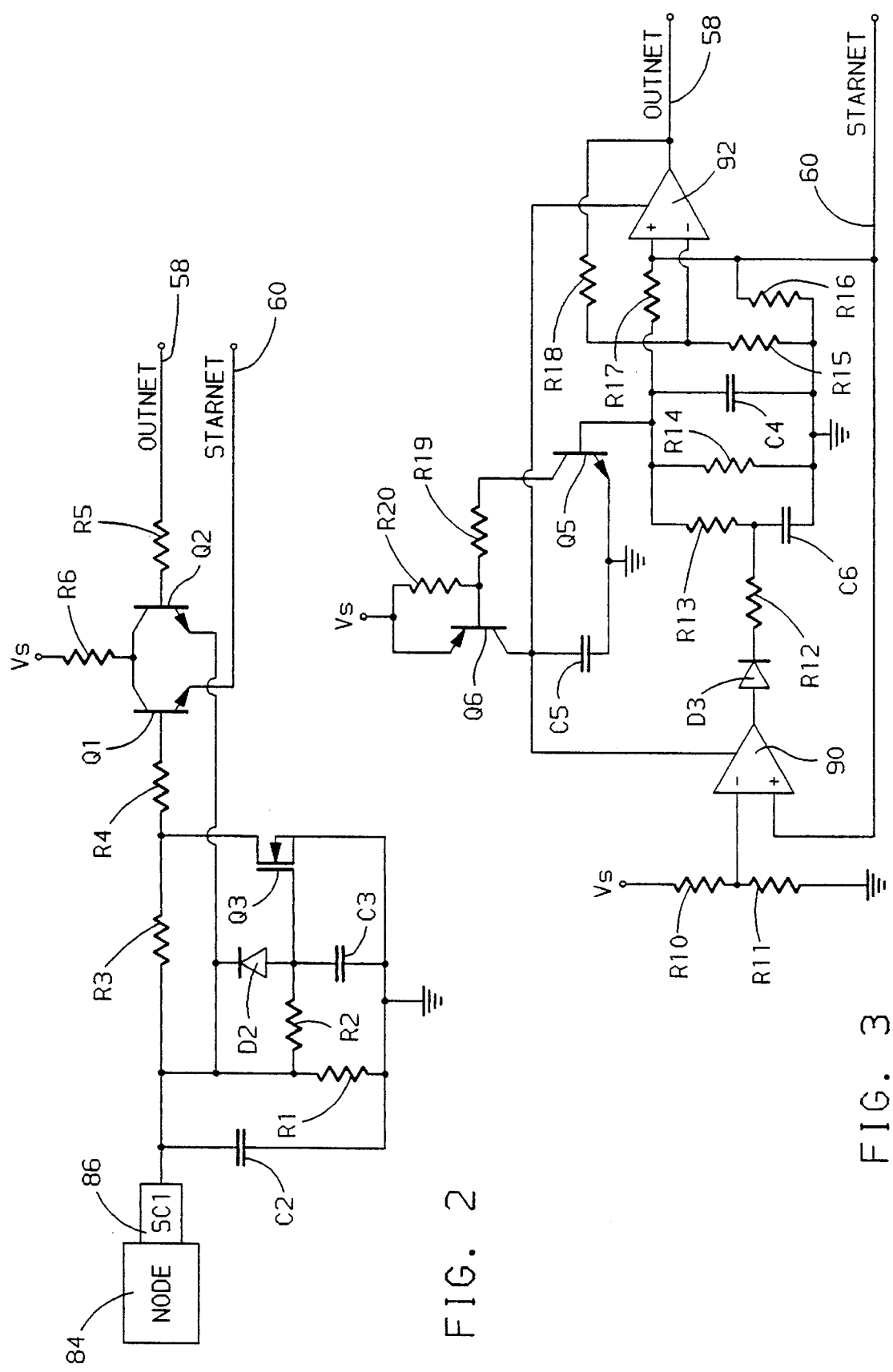
FIG. 2 is a schematic of the interface circuitry for each of the plurality of nodes of the network of FIG. 1.
FIG. 3 is an amplification stage and a wake-up and keep-alive stage of the network of FIG. 1.

The interface circuits of the present embodiment are of a single design, as will be further detailed in the FIG. 2. The interface circuits function to pass information between the corresponding node and the communication interface 20 and to provide fault tolerance. If a fault in a node results in a short to supply voltage, such as vehicle battery voltage, or a short to a ground reference voltage, the corresponding interface circuit will detect the short and rapidly and substantially unintrusively remove the node from the network to avoid passing the short through the network. While the faulty node will then not receive the benefit of the serial communication, the remaining nodes will be insulated from the fault, so as to continue to properly function for vehicle control, diagnostics, maintenance, etc.

The serial information from each node is echoed by the corresponding interface circuit to a common communication link STARNET 60 which is accessed by each of the interface circuits 42–52. The information from STARNET is provided to an amplifier stage 76 and to a wake-up circuit 78, having an output to communication link OUTNET 58. The link OUTNET is provided to each of the interface circuits 42–52, to provide for a sharing of the information on the link STARNET to each of the links 62–72. As such, STARNET provides information on serial communication inputs to the network and OUTNET provides that such information is echoed back to the nodes forming the network. Power is provided to the network from a power source, such as a conventional vehicle battery 34, connected to each of the interface circuits and to the amplifier 76 and wake-up circuit 78. Common diode D1 is in series with the voltage supply output line and is oriented so as to normally be forward biased, and to be reverse biased in the presence of reverse voltage conditions for electronics protection. Bypass capacitor C1 is disposed between supply voltage and a ground reference to filter high frequency supply voltage transients.

Referring to FIG. 2, the circuitry that forms the interface circuit for each of the nodes of the network is illustrated. As described, each node from the group of nodes making up the network, such as nodes 22–32 of FIG. 1, passes serial communication information to the network and receives information from the network through dedicated interface circuitry which, in this embodiment takes the form of the circuitry of FIG. 2. A node 84, which is meant to represent any node in the communication network to which this invention is applied, such as one of the nodes 22–32 of FIG. 1, inputs and outputs serial communication through a conventional serial communication interface SCI. The SCI may be configured to be compatible with the S.A.E. J1850 communication protocol. The SCI, in this embodiment, is connected to standard S.A.E. J1850 communication interface circuitry of capacitor C2, of approximately 470 picofarads, and pull-down resistor R1 of approximately 10 kilohms, both connected between the SCI output and a ground reference voltage, for voltage transient filtering and to pull an idle serial link to the low reference.

The SCI output passes through series resistors R3 and R4, each of about 10 kilohms in this embodiment, to base of standard npn transistor Q1. The collector of Q1 is connected to current limiting series resistor R6 of approximately 1 kilohm, which is connected to supply voltage Vs, which may be a regulated battery supply voltage of around twelve volts.

Capacitor C2 of about 470 picofarads is connected between the SCI output and the ground reference. Resistor R1 is likewise connected between the SCI output and the ground reference. Cathode of common diode D2 is connected between the SCI output and a first side of capacitor C3 of 0.02 microfarads, the other side of which is connected to the ground reference. Resistor R2 of 1 megohm is connected in parallel with diode D2. Gate of common FET Q3 is connected to the node formed between C3 and D2. The drain of FET Q3 is connected to the node formed between R3 and R4. The source of Q3 is connected to the ground reference. The collector of common transistor Q2 is pulled to Vs through resistor R6, and the emitter of Q2 is connected to the SCI output, to return information from OUTNET to the node 84 via the SCI. The base of Q2 is connected to OUTNET through resistor R5 of about 20 kilohms.

Functionally, the emitter of transistor Q1 in this configuration mirrors the SCI output signal, with high SCI output signals turning Q1 on and passing a high voltage through to the emitter thereof, and with low SCI output signals turning Q1 off, dropping the voltage at the emitter thereof low. The emitter is connected directly to the STARNET communication link 60. Thus, for each node of the network, a transistor configured as shown for Q1 passes serial data from the corresponding node and its serial communication interface to STARNET 60.

Timing circuitry is provided in FIG. 2 mainly through the R2-C3 combination, having a time constant of R2*C3. R2 is set to about 1 megohm in this embodiment, and C3 to about 0.02 microfarads, such that the time constant $\tau$ is about 20 milliseconds. This timeout circuitry is provided to detect a short on the communication link out of the SCI 86 to the supply voltage Vs in this embodiment. If such a short to Vs is present, the SCI output will remain high long enough that the calibrated time constant of the R2-C3 circuitry will be exceeded, causing C3 to be charged up to a voltage above the FET threshold voltage of about two volts. The voltage across C3 is applied to the gate of FET Q3, turning Q3 on, pulling the base of Q1 to ground through R4, disabling Q1. With Q1 thus disabled, the contribution of the corresponding node will appear inactive to the network, and will not pollute the network with the short circuit condition. If the short circuit to Vs condition is somehow resolved such that the SCI 86 output resumes a normal switching between low and high values, Q3 will be disabled, and Q1 will again pass the SCI output information to the link STARNET. Short to Vs conditions caused by a fault at node 84 or by an SCI fault are thus quickly diagnosed and isolated, with minimal interruption of serial communications on the network using low power, low cost circuitry.

Diode D2 is connected across resistor R2, and is oriented so that the anode of D2 is connected to the gate of FET Q3. This orientation of D2 will provide a low resistance bypass circuit around the large resistance of resistor R2 for rapid discharge of C3 whenever the serial communication link from SCI 86 drops low. The significant resistance of R2 is thus replaced by the small forward bias resistance of D2 when the serial link from SCI is low, reducing substantially the resistance in the discharge path of C3, which reduces significantly the associated R-C time constant, allowing for a much more rapid discharge of C3. Such a rapid discharge of C3 will prevent C3 from holding a high charge and thus falsely appearing as a short to Vs condition when the ratio of high to low communication signals from the corresponding node is substantial. In other words, as C3 only discharges when the serial link from the corresponding node is low, a substantial ratio of high to low signals will result in C3 being fully charged with little opportunity for any significant discharge in the presence of such a ratio. With C3 charged for such a significant period of time, a misdiagnosis of a short to Vs condition may be made through the circuitry described in FIG. 2. However, by providing a low resistance discharge path via diode D2, such potential for misdiagnosis is alleviated.

Protection for the node fault of a short to ground reference is provided in the interface circuit provided in this embodiment in accord with this invention by isolating the fault within the interface circuit so that it is not passed to the network. Specifically, referring to FIG. 2, if the serial communication output from a node, such as node 84 through its SCI 86, is grounded, isolation is provided for through the generally understood isolation properties of transistor Q2 wherein the emitter of Q2 will be at ground reference due to the fault condition and OUTNET information passed to the base of Q2 will not be loaded down by the fault condition at the node 84. Such is a simple, inexpensive yet robust isolation technique for fault conditions at the node, in accord with the advantages provided through this invention.

Referring to FIG. 3, circuitry making up the amplifier 76 (FIG. 1) and making up the wake-up circuit 78 (FIG. 1) is shown. The amplification is provided to the signal on STARNET to compensate for losses in the circuitry of the plurality of interface circuits of the network. For example, transistor losses in circuits such as that described in FIG. 2 that tend to attenuate signals on STARNET are at least partially compensated through the amplifier of FIG. 3. To ensure signal stability in the interface circuit, the magnitude of amplification provided should be set such that the amplified signal is not greater than the amplitude of the signal initially received by the interface circuit from the node.

The wake-up circuitry disables an operational amplifier (op-amp) used in the amplifier circuit during periods when the serial communication network is not active. The significant standby current of the op-amp otherwise would cause unnecessary consumption of power in the circuit.

Structurally, STARNET link 60 is passed to the non-inverting input of op-amp 92 and to the non-inverting input of op-amp 90. The inverting input of op-amp 90 is provided a bias point voltage, to be described. The output of op-amp 90 passes through common diode D3 and through resistor R12 of approximately 1000 ohms to a node formed by a connection of common capacitor C6 of about 0.47 microfarads and common resistor R13 of about 100 kilohms. The side of C6 opposite to the R12 connection point is set to the ground reference. Common resistor R14 of approximately 40 kilohms is connected in parallel across the series connection of C6 and R13, and common capacitor C4 of 0.001 microfarads is likewise connected in parallel with that series connection.

The node formed by the connection of R13, R14, and C4 is connected to the base of common transistor Q5 and to resistor R17 of ten kilohms. The other side of R17 is provided to the non-inverting input of op-amp 92, and thus to STARNET link 60. The inverting input of op-amp 92 passes through common resistor R15 to ground reference. The output of op-amp 92 is passed back to the inverting input via feedback resistor R18 of 1.15 kilohms. This output also is connected to OUTNET link 58.

Supply voltage signal Vs is provided to emitter of transistor Q6, and the collector thereof is connected to common capacitor C5. The other side of the capacitor is at ground reference. The collector is also connected to the supply voltage input of both op-amps 90 and 92, to control the power applied thereto. The base of Q6 is pulled up to Vs through common resistor R20 of about 100 kilohms. The base of Q6 is also tied to the collector of common transistor Q5 via resistor R19 of ten kilohms. The emitter of Q5 is at ground reference.

Functionally, a high signal on STARNET 60 charges capacitor C4 through resistor R17. The voltage across C4 is thereby rapidly charged to a level exceeding the turn-on voltage of common npn transistor Q5, such that Q5 turns on. The emitter of Q5 is at the ground reference, and the collector of Q5 is tied to the base of common pnp transistor Q6 through series resistor R19 of approximately ten kilohms. The base of Q6 is pulled up to supply voltage Vs through resistor R20 of approximately 100 kilohms, to hold the base of Q6 high when Q6 is disabled. The source voltage Vs is provided to the emitter of Q6, and the collector of Q6 is provided as supply power to both of op-amps 90 and 92. Common capacitor C5 is provided between the collector of Q6 and ground for op-amp power supply filtering purposes. As such, Q6 must be on for the op-amps 90 and 92 to operate.

Q6 is selectively turned on when an active serial communication network is detected, as follows. The network activity results in Q5 turning on, as described, which turns Q6 on, providing to op-amps 90 and 92 supply voltage sufficient in magnitude to allow for the operation thereof. Once the op-amps 90 and 92 have been "awakened" in the described manner, they are kept alive in the following manner. Resistors R10 and R11 are arranged in a voltage divider configuration to provide a bias point to the inverting input of op-amp 90 which is arranged in a comparator configuration. In this embodiment, R10 is selected as approximately 100 kilohms and R11 is selected as about thirty kilohms, providing, with the supply voltage Vs of approximately twelve volts in this embodiment, a bias point of approximately 2.8 volts to the inverting input of op-amp 90. The non-inverting input of op-amp 90 is connected to STARNET link 60, such that the output of op-amp 90 in its comparator configuration is set high when STARNET signal amplitude exceeds the 2.8 volt bias point. In other words, communication activity on the STARNET link will drive the output of op-amp 90 high.

The high op-amp 90 output forward biases diode D3 and charges up conventional capacitor C6 of approximately 0.47 microfarads through series resistor R12 of approximately 1000 ohms. In the event the op-amp output is low, D3 prevents the op-amp 90 from sinking current and thus discharging C6. Common resistor R14 is provided between the base of Q5 and ground, to complete a discharge path for capacitor C6. When the signal on STARNET link 60 drops below the bias point established by resistors R10 and R11, the op-amp output will drop low, and C6 will begin to discharge through R13 and R14, gradually reducing the voltage at the base of Q5, so that after a discharge time period, Q5 will be turned off, removing power to the op-amps 90 and 92 and putting the circuit in standby mode in which power requirements thereof are minimized.

Values for R13, R14, and C6 are therefore selected so that the time required for the voltage applied to the base of Q5 to discharge to a level at which Q5 is disabled corresponds the amount of time desired to keep the interface circuits of this embodiment active in an absence of high signals on the serial link or bus from any of the nodes of the network.

For the present embodiment, Q5 will be disabled after a period of about 80 milliseconds of serial communication inactivity. The period of eighty milliseconds reflects a compromise between a time period sufficiently long so that power cycling during a message is avoided yet using circuit components (specifically R12 and C6) that allow for a rapid charging on a first high communication pulse so as to remain awake during low pulses that may follow that first high pulse. Accordingly, in this embodiment, C6, R13 and R14 are set so that after approximately 80 milliseconds without high signal activity on the STARNET, the voltage at the base of Q5 will have discharged to a sufficiently low level that Q5 will turn off, disabling Q6, as described. If any high signal activity is present on STARNET, the voltage across C6 will be reset to a high level, resetting the discharge time period.

Turning to the amplifier portion of the circuit of FIG. 3, once the op-amps 90 and 92 are activated through detection of activity on STARNET as described, op-amp 92, arranged in a well-known non-inverting amplifier configuration, amplifies the signal on STARNET link 60. Amplifier feedback resistor R18 is set to about 1.15 kilohms and input resistors R15 and R17 are each set to ten kilohms, providing an amplification of slightly greater than one, to compensate for minor losses in the interface circuitry of this embodiment, as described. Pull-down resistor R16, of approximately 100 kilohms operates to hold STARNET substantially at the ground reference during periods of network inactivity.

The hardware described for the present embodiment and illustrated in the FIGS. 2 and 3 is but one example of this invention. Through ordinary circuit design skill, one may provide variations in the amplification, wake-up and stay-alive circuitry of FIG. 3, as well as the interface fault detection and isolation circuitry of FIG. 2. For example, a wide variety of simple circuit substitutions for various parts of the circuitry of this embodiment are readily available in the art, as may be found in widely available circuit design literature. Simply by referencing such generally available and well-understood information, one may substitute a variety of amplifier, wake-up, and keep-alive circuitry for that of the present embodiment.

The preferred embodiment for the purpose of explaining this invention is not to be taken as limiting or restricting the invention since many modifications may be made through the exercise of ordinary skill in the art without departing from the scope of the invention.

The embodiments of the invention in which a property or privilege is claimed are described as follows:

1. A fault tolerant automotive on-board serial communication network having a plurality of nodes and a central communication interface, each of the plurality of nodes having at least one automotive electronic device associated therewith, wherein the automotive electronic device of any of the plurality of nodes may communicate bi-directionally with the electronic devices of the other of the plurality of nodes across the communication interface, the communication interface further comprising:

an input serial communication link;

an output serial communication link;

a signal amplifier for receiving serial communication information from the input serial communication link and for outputting amplified serial communication information on the output serial communication link; and an interface circuit for communicating input serial communication information from at least one automotive electronic device to the input serial communication link and for communicating the amplified serial communication information from the output serial communication link to the at least one automotive electronic device, the interface circuit including fault tolerance circuitry for detecting the presence of any of a predetermined set of fault conditions indicated by the input serial communication information and for electronically isolating the communications network from the at least one automotive electronic device upon detecting the presence of any of the predetermined set.

2. The apparatus of claim 1, wherein the isolation provided by the fault tolerance circuitry is removed when the presence of any of the predetermined set is no longer detected.

3. The apparatus of claim 1, further comprising a wake-up circuit for controlling the operation of the amplifier, to disallow operation of the amplifier when the input serial communication link is inactive.

4. The apparatus of claim 1, wherein the fault tolerance circuitry further comprises:

a timeout circuit for detecting a predetermined short circuit fault condition when the input serial communication information exceeds a predetermined threshold voltage level for greater than a predetermined period of time, and wherein the predetermined set of fault conditions includes the predetermined short circuit fault condition.

5. The apparatus of claim 1, wherein the fault tolerance circuitry further comprises:

a timeout circuit for detecting a predetermined short circuit fault condition when the input serial communication information is less than a predetermined threshold voltage level for greater than a predetermined period of time, and wherein the predetermined set of fault conditions includes the predetermined short circuit fault condition.

6. A fault tolerant automotive serial communication network in which a plurality of automotive electronic devices communicate through a central communication node, comprising:

an input serial communication link for inputting serial communication from the plurality to the node;

an output serial communication link for outputting serial communication information from the node to the plurality;

a signal amplifier included in the node for receiving serial communication information from the input serial communication link and for outputting amplified serial communication information on the output serial communication link; and an interface circuit for passing input serial communication information from at least one of the plurality to the input serial communication link and for passing output serial communication information from the output serial communication link to the at least one of the plurality, the interface circuit including fault tolerance circuitry for diagnosing an occurrence of any of a predetermined set of serial communication fault conditions indicated by the input serial communication information from the at least one of the plurality and for removing the at least one of the plurality from the network in response to the diagnosed occurrence.

7. The method of claim 6, wherein the fault tolerance circuitry restores the at least one of the plurality when the occurrence is no longer diagnosed.

8. The apparatus of claim 6, further comprising a wake-up circuit for controlling the operation of the amplifier, to disallow operation of the amplifier when the serial communications on the input serial communication link corresponds to predetermined communication conditions indicating an inactive serial communication network.

9. The apparatus of claim 6, wherein the fault tolerance circuitry further comprises:

a timeout circuit for detecting a predetermined short circuit fault condition when the input serial communication information exceeds a predetermined threshold voltage level for greater than a predetermined period of time, and wherein the predetermined set of fault conditions includes the predetermined short circuit fault condition.

10. The apparatus of claim 6, wherein the fault tolerance circuitry further comprises:

a timeout circuit for detecting a predetermined short circuit fault condition when the input serial communication information is less than a predetermined threshold voltage level for greater than a predetermined period of time, and wherein the predetermined set of fault conditions includes the predetermined short circuit fault condition.

* * * * *